Nov. 17, 1964 K. BAMMESBERGER ETAL 3,157,749

METHOD AND APPARATUS FOR SUPERIMPOSING AN ADDITIONAL RECORDING UPON AN EXISTING SOUND RECORD

Filed Oct. 11, 1961 2 Sheets-Sheet 1

INVENTORS:
KARL BAMMESBERGER
WOLFGANG STRAUB
PETER UNGNADNER

BY Connolly and Hutz
ATTORNEYS

INVENTORS:
KARL BAMMESBERGER
WOLFGANG STRAUB
PETER UNGNADNER
BY
Connolly and Hutz
ATTORNEYS 3,157,749

METHOD AND APPARATUS FOR SUPERIMPOSING AN ADDITIONAL RECORDING UPON AN EXISTING SOUND RECORD

Karl Bammesberger, Munich-Allach, and Wolfgang Straub and Peter Ungnadner, Unterhaching, near Munich, Germany, assignors to Agfa Aktiengesellschaft, Leverkusen-Bayerwerk, Germany, a corporation of Germany Filed Oct. 11, 1961, Ser. No. 144,353
Claims priority, application Germany Oct. 15, 1960
13 Claims. (Cl. 179—100.2)

This invention relates to a method and apparatus for adapting a magnetic sound recording device incorporating recording and erasing heads to blend an additional recording into an existing sound record, and it more particularly relates to such a method and apparatus in which the erasing head is inactivated.

There are various existing "blending devices" for use with magnetic tape recording machines, which permit an additional recording to be superimposed upon an existing sound record. In recording a musical and verbal sound track upon motion picture film, it is desirable to first record the musical background and then to blend the verbal commentary into it. This blending is particularly desirable upon narrow gauge film where very little space is available for applying a magnetic sound track upon its marginal edge. In such blending, it is also highly desirable to gradually reduce the volume of the musical background just before the superimposed verbal commentary is blended into it and then to restore the musical background to its original volume after the verbal commentary has been applied over it. In these existing arrangements the erasing head of the recording device is usually disconnected during the application of the second recording, and the high frequency biasing current of the recording head is used to partially erase the original sound recording. In superimposing words over music, it is desirable to only gradually reduce the volume of the original musical sound record just before the verbal commentary is blended into it. In so doing, these existing arrangements have connected an electronic retarding device to the recording head to permit its biasing current to only slowly increase to its full strength. Such a retarding device is also required for slowly decreasing its biasing current after the blending operation has been completed. These existing electronic devices are relatively complicated and expensive making them costly to manufacture, and therefore the overall cost of a magnetic tape recording device incorporating such a blending and retarding device is made almost prohibitively expensive.

An object of this invention is to provide a relatively simple and economical method and apparatus for gradually blending a second sound record into an existing sound record upon a magnetic sound recording device.

In accordance with this invention the recording head is maintained out of magnetic contact and then gradually restored into magnetic contact with the sound track when an additional recording is to be blended into an existing sound record. An apparatus for accomplishing this purpose includes a manually-operated linkage for gradually raising and lowering the recording head away from and into magnetic contact with the tape. Such a linkage advantageously incorporates eccentric and slotted lever means in which the eccentric consists of a rotatable knob having a pin mounted remote from its axis of rotation which is engaged within a slot in the lever. When the recording head is spring biased toward the tape, it is advantageous to arrange the lever to engage under the recording head for lifting it out of magnetic contact with the tape against the force of the biasing spring.

Additional means for providing such gradual movement toward and away from the tape can also be provided for the erasing head. The controls for manipulating the recording and/or the erasing heads can be arranged upon a casing upon the magnetic sound recording device which encloses the heads and is preferably detachable. A device made in accordance with this invention is particularly useful for sound motion picture apparatus.

The method and apparatus of this invention are particularly advantageous in that they permit additional recordings to be blended into existing sound records upon magnetic tape in an extremely straightforward manner. This purpose is accomplished by a novel arrangement of simple, inexpensive, mechanical components; and any complicated mechanical or electronic components are thereby avoided. Furthermore, it is extremely simple and straightforward in operation by even the most inexperienced type of operator.

Novel features and advantages of the present invention will become apparent to one skilled in the art from a reading of the following description in conjunction with the accompanying drawings wherein similar reference characters refer to similar parts and in which.

Figure 1:
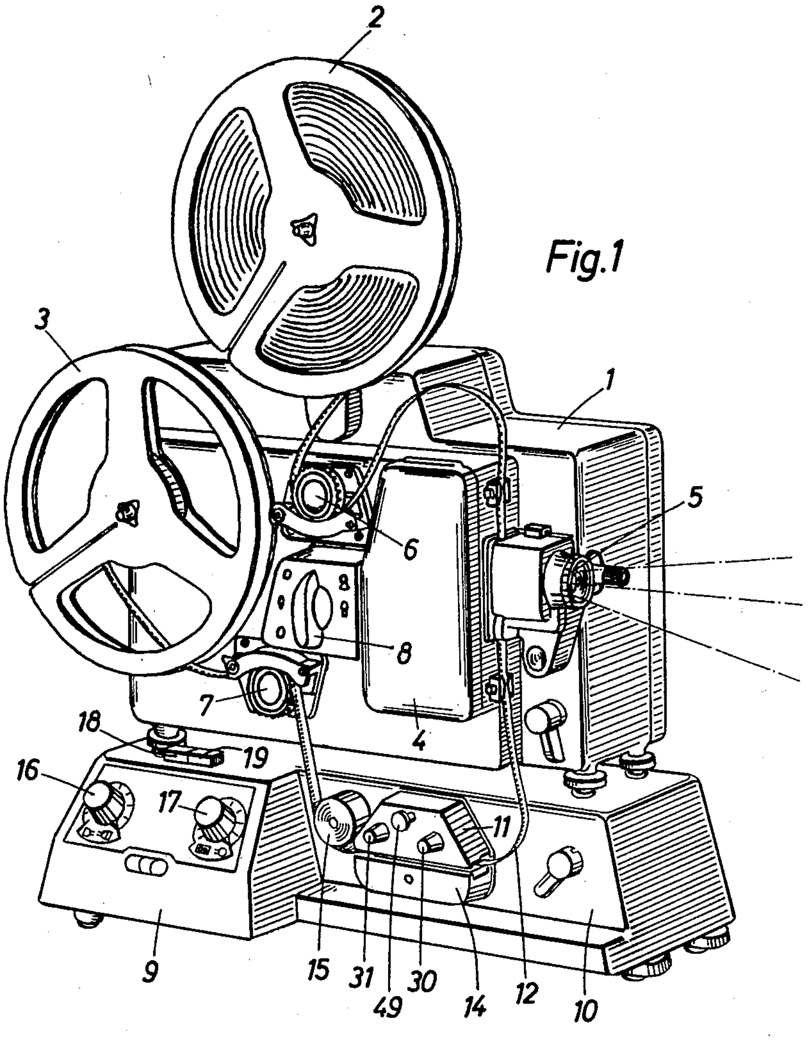
FIG. 1 is a perspective view of a sound motion picture projector for narrow gauge film incorporating a base which includes one form of this invention for blending an additional recording into an existing sound record.

In FIG. 1 is shown a narrow gauge motion picture projector 1, which is for example of the 8 millimeter size. Projector 1 incorporates conventional components including a film supply reel 2, a film takeup reel 3, a lamp housing 4, a projection lens 5, film feeding sprockets 6 and 7 and a control switch 8 for operating the film feeding components and projection lamp.

Figure 2:
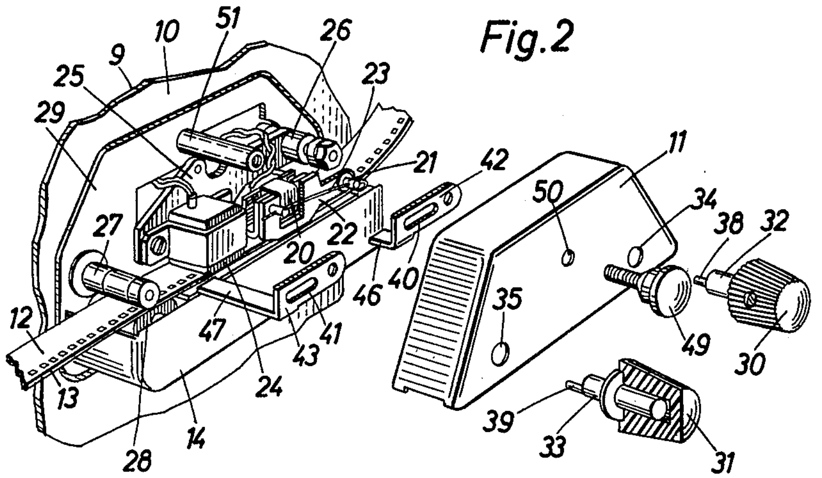
FIG. 2 is an exploded perspective view of parts of the embodiment of this invention shown in FIG. 1.

The sound recording base 9 includes upon its side a detachable casing 11 enclosing the magnetic heads of the magnetic sound recording and play-back apparatus which are thereby concealed in FIG. 1. The film strip 12 as shown in FIG. 2 has a magnetic sound track 13 applied to its marginal edge which passes under the later described magnetic heads during its path of travel between the projecting aperture (arranged in back of projection lamp 5) and the transporting sprocket 7 of projector 1. Also mounted upon the side 10 of sound base 9 is tape carrier 14, which is vertically adjustable in a conventional manner for maintaining the film engaged between sound roller 27 and pressing roller 28 (shown in FIG. 2). Also mounted upon surface 10 is guiding roller 15. Control knobs 16 and 17 and push buttons 18 and 19 are also mounted upon sound base 9 for controlling the sound volume and for switching the sound base from "recording" and "play-back" operations, for example by connecting and disconnecting the sound recording and play-back components into operation. When the sound base is adjusted to perform the "recording" operation, the erasing head as well as the combined recording play-back head are both connected into the magnetic operating circuits; whereas during the "play-back" operation, the erasing head is disconnected from the magnetic circuit and the combined recording and play-back head is connected with the amplifier circuit.

Figure 3:
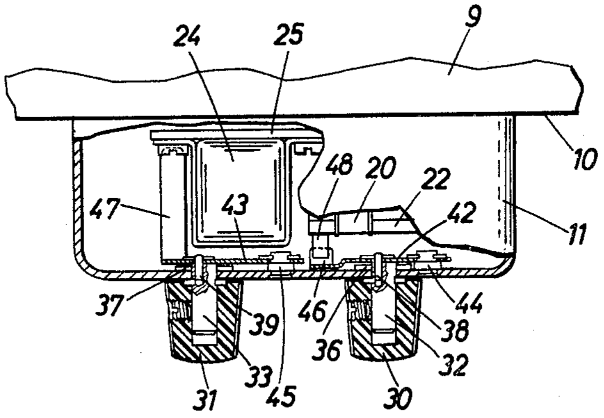
FIG. 3 is a plan view partially broken away in cross section of the portion of the embodiment shown in FIG. 2.

These magnetic heads are shown in detail in FIGS. 2 and 3. Erasing head 20 is mounted upon a rotatable lever 22 which pivots about shaft 21. Spring 23 reacts between shaft 21 and erasing head 20 in a direction to urge head 20 into contact with sound track 13 upon the marginal edge of film strip 12 which is supported by carrier 14. In substantially this same manner combined recording and play-back head 24 is mounted upon a lever 25, which is rotatably mounted upon shaft 26. Another spring (not shown) also reacts against lever 25 in a direction to urge head 24 into contact with magnetic sound track 13 upon film strip 12. Shafts 21 and 26 which rotatably support levers 22 and 25, film supporting device 14, sound roller 27 (connected to a flywheel which is not shown) and a pressing roller 28 are mounted upon a supporting plate 29 which is secured to the side 10 of sound base 9. The operating linkage for controlling the movement of magnetic heads 20 and 24 toward and away from film strip 12 incorporates two manually rotatable knobs 30 and 31 whose shafts 32 and 33 extend through openings 34 and 35 in detachable casing head 11 which enclose magnetic heads 20 and 24. As is specifically shown in FIG. 3, retaining rings 36 and 37 mounted inside casing 11 upon shafts 32 and 33 maintain knobs 30 and 31 rotatably secured to casing 11.

Pins 38 and 39 are respectively eccentrically mounted upon shafts 32 and 33, and they are engaged respectively within slots 40 and 41 (shown in FIG. 2) of slotted levers 42 and 43 which themselves are rotatably mounted upon pins 44 and 45 secured within casing 11. Tongues 46 and 47 respectively extend from levers 42 and 43 for example at right angles therefrom. Tongue 46 of lever 42 engages under lug 48 attached to erasing head 20, and tongue 47 engages under a portion of lever 25 carrying the combined recording and play-back head 24.

In their positions for commencing the blending of an additional sound recording into an additional sound record, knobs 30 and 31 and respective slotted levers 42 and 43 permit magnetic heads 20 and 24 to be maintained in magnetic contact with sound track 13 of film strip 12 by virtue of the resilient reactions of the springs which react against them. During the normal recording of a sound record, any record which might formerly have been recorded is removed by erasing head 20, and a new sound record such as a musical background is recorded by means of the combined recording and play-back head 24 which contacts sound track 13 after it has passed under erasing head 20.

When it is desired to blend an additional recording such as a verbal commentary upon the original musical background recording, film strip 12 is first wound back to the position where it is desired to introduce the verbal commentary. In so doing, it is necessary to be careful to avoid the erasing of the existing recording by maintaining the erasing head inactive. When the additional recording is to be superimposed, magnetic heads 20 and 24 are raised away from contact with sound track 13 of film strip 12 by turning knobs 30 and 31 in a clockwise direction. In this manner heads 20 and 24 are both inactivated although it is still possible to maintain magnetizing currents flowing through them at all times. Then the erasing head is maintained in the raised inactivated position while combined recording and play-back head 24 is slowly lowered into magnetic contact with sound track 13 of film strip 12 by slowly turning knob 31 counterclockwise back into original position. In this manner the effect of magnetic head 24 through which the bias current is flowing upon sound track 13 is gradually increased whereby the original sound record is gradually reduced in intensity until head 24 rests in effective magnetic contact with track 13. At this time the effect of the bias current flowing through head 24 in decreasing the intensity of the original sound record reaches a limiting value depended upon the intensity of the bias current. This effect is usually arranged to allow a diminished volume of the original recorded sound record to remain upon the tape to provide a faint musical background for the verbal commentary.

Then the additional sound record such as a verbal commentary upon the film is recorded upon the original sound record upon track 13 through magnetic head 24 to superimpose it upon the diminished original musical recording. At the end of the superimposing process, head 24 is then gradually raised away from magnetic contact with track 13 by turning knob 31 slowly clockwise until the bias current through magnetic head 24 is out of effective range of track 13.

When the combined sound record is then played back after film strip 12 is rewound and the recording base switched to playback, one hears first the originally recorded musical sound record which starts to gradually decrease at the point where the verbal commentary is blended into it and continues to decrease gradually to a faint volume. Thereafter the superimposed sound records are heard simultaneously with the later recorded commentary at a relatively great volume and the musical background at a faint volume until the superimposed portion of the recording is completed when the originally recorded sound record once more gradually regains its original full volume.

Eccentrically mounted pin 39 upon knob 31 and its engagement within slot 41 of lever 43 forms a motion-reducing linkage for facilitating an extremely slow raising and lowering of recording head 24 in response to rotation of knob 31. This highly facilitates the superimpositions of additional recordings in a very smooth and gradual transition.

Casing 11 upon which knobs 30 and 31 and slotted levers 42 and 43 are mounted is conveniently detachably mounted by cap screw 49 upon sound base 9. Cap screw 49 extends through hole 50 in casing 11 and engages within a threaded post 51 mounted upon plate 29. This provides convenient access to the blending device for maintenance and replacement, if required. It also facilitates the provision of such a blending device upon existing sound recording device without the necessity of making extensive changes in it.

Within the spirit of this invention it is also possible to move sound carrier 13 toward and away from magnetic heads 24 for blending an additional recording into an existing recording as well as by the described mode of movement of heads 20 and 24. It is also possible to move both the magnetic heads and the carrier toward and away from each other to provide adjustment of the distance of the magnetic head from the sound track.

It is also possible to inactivate erasing head 20 during the blending of the additional sound record into an existing sound record by interrupting the magnetizing current flowing through it instead of raising it away from sound track 13 upon film strip 12. Although a blending device of the type described can be used for all types of magnetic sound recorders, it is particularly advantageous for use in conjunction with sound motion picture apparatus.

What is claimed is:

1. A method of operating a magnetic recording apparatus having an erasing head, a recording head, and manually operable switch means for switching said apparatus from recording to playback operations and from playback to recording operations wherein said erasing head is switched on during recording operations and whereby said recording head is used for blending an additional recording into a sound record upon a magnetic sound track which comprises the steps of switching said apparatus for recording operation, moving said erasing head to a non-effective position, removing said recording head from effective magnetic contact with said sound track in a direction substantially perpendicular to the plane of said sound track, applying biasing current to said recording head and gradually moving said recording head while said biasing current is being applied into effective magnetic contact with said sound record at the portion of said sound track into which said additional recording is to be blended.

2. A method as set forth in claim 1 wherein said recording head is gradually removed from said sound track while said biasing current is being applied to it after said additional recording has been blended into said existing sound record.

3. An apparatus for adapting a magnetic sound recording device incorporating means for transporting a magnetic tape, an erasing head, a recording head, and manually operable switch means for switching said apparatus from recording to playback operations and from playback to recording operations, wherein said erasing head is switched on during recording operation and whereby said recording head is usable for blending an additional recording into an existing sound record upon said magnetic tape, said apparatus comprising means for moving said erasing head to a non-effective position during recording operations, a movable support mounting said recording head for movement toward and away from said tape in a plane substantially perpendicular to the plane of said tape, said movable support allowing movement of said recording head from a position providing effective magnetic contact with said tape to a remote position out of effective magnetic contact with said tape, an elevating linkage mounted upon said device in operative connection with said recording head, manual operating means connected to said linkage, and motion-reducing means incorporated in said linkage for facilitating the gradual movement of said recording head toward and away from effective magnetic contact with said tape.

4. An apparatus as set forth in claim 3 wherein said movable supporting means comprises a pivoted lever upon which said recording head is mounted.

5. An apparatus as set forth in claim 3 wherein said motion-reducing means comprises an eccentric and slotted lever means, a manipulating element being connected to rotate said eccentric, and said slotted lever being incorporated in said elevating linkage to permit selective gradual elevation and lowering of said recording head.

6. An apparatus as set forth in claim 5 wherein said eccentric means comprises a rotatable knob having a pin mounted remote from its axis of rotation.

7. An apparatus as set forth in claim 6 wherein said slotted lever is rotatably mounted upon said device, and said slotted lever includes a tongue disposed under said recording head for lowering and raising it.

8. An apparatus as set forth in claim 7 wherein said recording head is resiliently biased toward said tape.

9. An apparatus as set forth in claim 8 wherein said knob and said slotted lever are rotatably mounted upon a casing which encloses said recording head, said casing being detachably secured to said apparatus to permit said knob and slotted lever to be disengaged from said apparatus by removal of said casing, and said tongue extending in the direction of engagement and disengagement of said casing for facilitating its attachment and removal.

10. An apparatus as set forth in claim 3 wherein spring means reacts against said recording head in a direction to maintain it in contact with said tape, and said elevating means being connected to said recording head in a manner which permits it to raise it away from said tape against the force of said spring and to lower it by allowing the force of said spring to react upon said recording head and lower it into magnetic contact with said tape.

11. An apparatus as set forth in claim 3 wherein said means for moving said erasing head to a noneffective position includes second elevating means for raising said erasing means away from said tape.

12. An apparatus as set forth in claim 11 wherein said motion-reducing means are provided for said elevating means connected to said recording head and said erasing head, said motion-reducing means comprising eccentric and slotted lever means, said eccentric means comprising rotatable knobs having pins mounted remote from their axis of rotation, a detachable casing mounted upon said magnetic sound recording device over said recording and erasing heads, said rotatable knobs and slotted levers being rotatably mounted upon said casing, and tongues extending from said slotted levers under said recording and erasing heads for controlling their movement toward and from said tape.

13. An apparatus as set forth in claim 12 wherein springs react against said recording and erasing heads in a direction to move them into magnetic contact with said tape.

References Cited in the file of this patent

UNITED STATES PATENTS

| | | |
|---|---|---|
| 2,832,599 | Debrie | Apr. 29, 1958 |
| 2,912,519 | Simmons | Nov. 10, 1959 |
| 3,012,105 | Bach | Dec. 5, 1961 |

FOREIGN PATENTS

| | | |
|---|---|---|
| 158,221 | Sweden | Mar. 19, 1957 |
| 590,297 | Canada | Jan. 5, 1960 |